(12) United States Patent
Liu

(10) Patent No.: US 8,199,474 B2
(45) Date of Patent: Jun. 12, 2012

(54) BRACKET FOR HOLDING PORTABLE DEVICE

(75) Inventor: Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 210 days.

(21) Appl. No.: 12/688,902

(22) Filed: Jan. 17, 2010

(65) Prior Publication Data

US 2011/0122565 A1 May 26, 2011

(30) Foreign Application Priority Data

Nov. 20, 2009 (CN) .......................... 2009 1 0310171

(51) Int. Cl.
 *G06F 1/16* (2006.01)
(52) U.S. Cl. ......... 361/679.23; 361/679.33; 361/679.58; 312/223.1; 312/223.2; 248/686; 248/691
(58) Field of Classification Search .............. 361/679.23
 See application file for complete search history.

(56) References Cited

U.S. PATENT DOCUMENTS

| | | | | |
|---|---|---|---|---|
| 2,992,854 A * | 7/1961 | Berlin | ........................... | 297/256 |
| 3,578,282 A * | 5/1971 | Olsen | ........................... | 248/214 |
| 3,991,966 A * | 11/1976 | Breer, II | ........................ | 248/444 |
| D362,753 S * | 10/1995 | Bland | ........................... | D3/260 |
| 5,619,395 A * | 4/1997 | McBride | ................... | 361/679.58 |
| 6,142,796 A * | 11/2000 | Behl et al. | ..................... | 439/131 |
| 6,481,681 B1 * | 11/2002 | Stunkel et al. | ........... | 248/231.31 |
| 6,663,066 B1 * | 12/2003 | Hong | ........................... | 248/231.41 |
| 6,795,029 B2 * | 9/2004 | Baker | ........................... | 343/702 |
| 7,232,105 B2 * | 6/2007 | Want et al. | .................... | 248/691 |
| 7,333,328 B2 * | 2/2008 | Funawatari et al. | ..... | 361/679.33 |
| 7,431,253 B2 * | 10/2008 | Yeh | ............................. | 248/286.1 |
| 7,546,995 B2 * | 6/2009 | Axel | ............................. | 248/444 |
| 7,740,222 B2 * | 6/2010 | Wang | ............................ | 248/691 |
| 7,813,114 B2 * | 10/2010 | Stewart et al. | ........... | 361/679.23 |
| 7,813,117 B2 * | 10/2010 | Olesiewicz et al. | ...... | 361/679.34 |
| 2005/0243506 A1 * | 11/2005 | Robertson et al. | ............ | 361/685 |

* cited by examiner

*Primary Examiner* — Anthony Q Edwards
(74) *Attorney, Agent, or Firm* — Altis Law Group, Inc.

(57) ABSTRACT

A bracket is for holding a portable hard disk on a display of a computer. The bracket includes a base fixed to the portable hard disk and a pair of arms pivotably attached to the base. The base includes a plate secured to the portable hard disk, a pair of sidewalls extending from the plate and pair of post extending from the plate between the two sidewalls. Each arm includes a tab pivotably mounted on the post via a screw, and a flange extending from the tab. The arms could be pivoted with respect to the base to sandwich the display of the computer between the flanges and the sidewalls of the bracket.

14 Claims, 5 Drawing Sheets

BRACKET FOR HOLDING PORTABLE DEVICE

BACKGROUND

1. Technical Field

The present disclosure relates to a bracket and, more particularly, to a bracket for holding a portable device on a display of a computer.

2. Description of Related Art

Nowadays PHD (Portable Hard Disk) is widely used in personal and commercial applications, due to many advantages thereof compared with other data storage mediums, such as huge storage capability, small volume, easy to be transported and so on. In use, the PHD is generally put on a desk where a computer is disposed, and connects with the computer via a data-transferring wire to delivery data therebetween.

The conventional method of putting the PHD on the desk may cause the PHD in risk. Since the PHD is often optionally disposed on the desk without a fixed position, the user may carelessly impact the PHD away from its original position to disconnect the PHD from the data-transferring wire, thereby resulting in date-interrupt between the PHD and the computer. Even worse, if the impact is large enough, the PHD may be pushed to fall off the desk and thereby damaged. On the other hand, the PHD lying on the desk should occupy a part of a supportive surface of the desk, thus leaving less space for other objects intended to be disposed on the desk.

What is needed, therefore, is a bracket for holding a portable hard disk which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
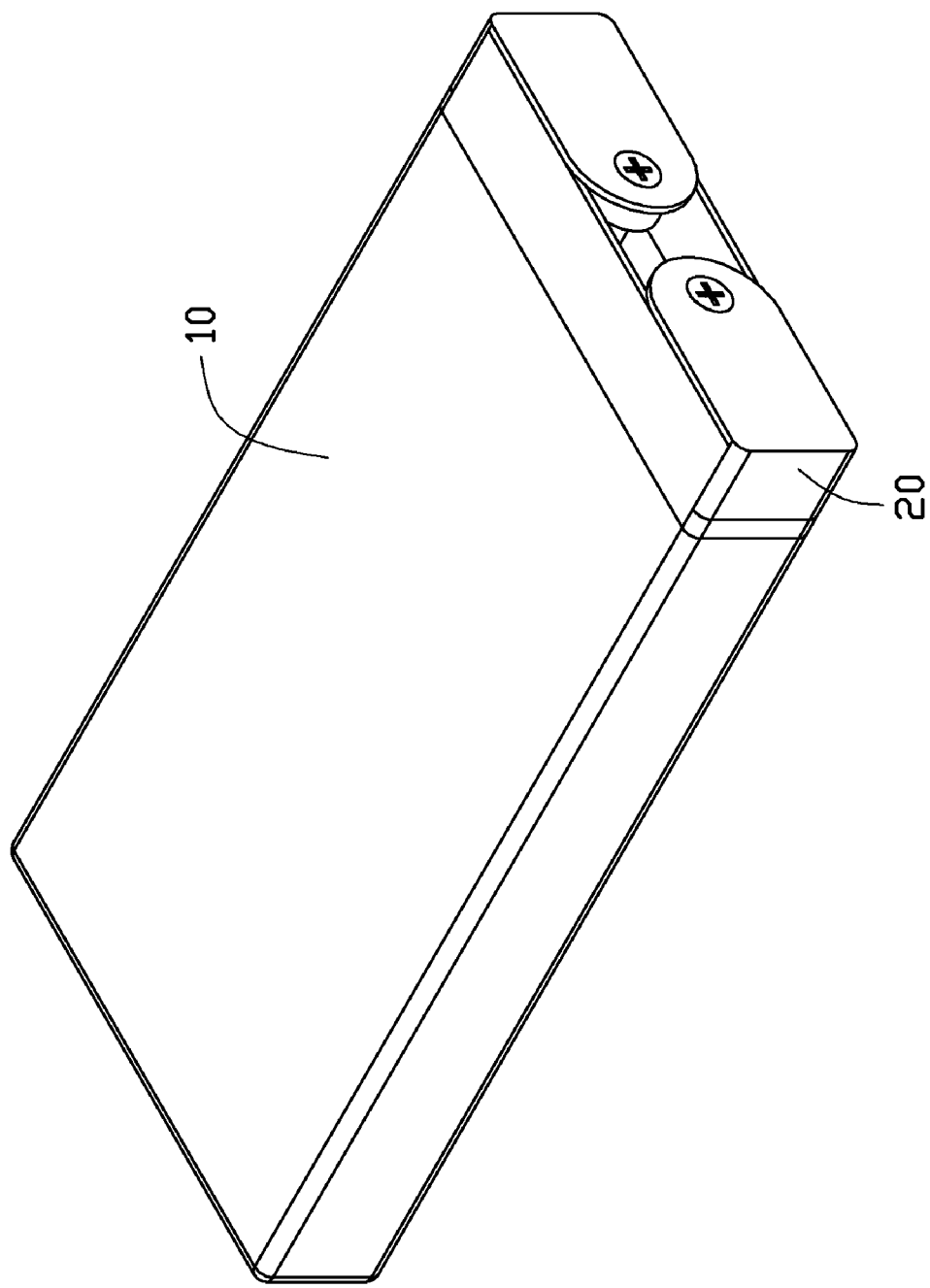
FIG. 1 shows a bracket in accordance with an embodiment of the present disclosure assembled to a portable hard disk, wherein the bracket is in a closed position.
Figure 2:
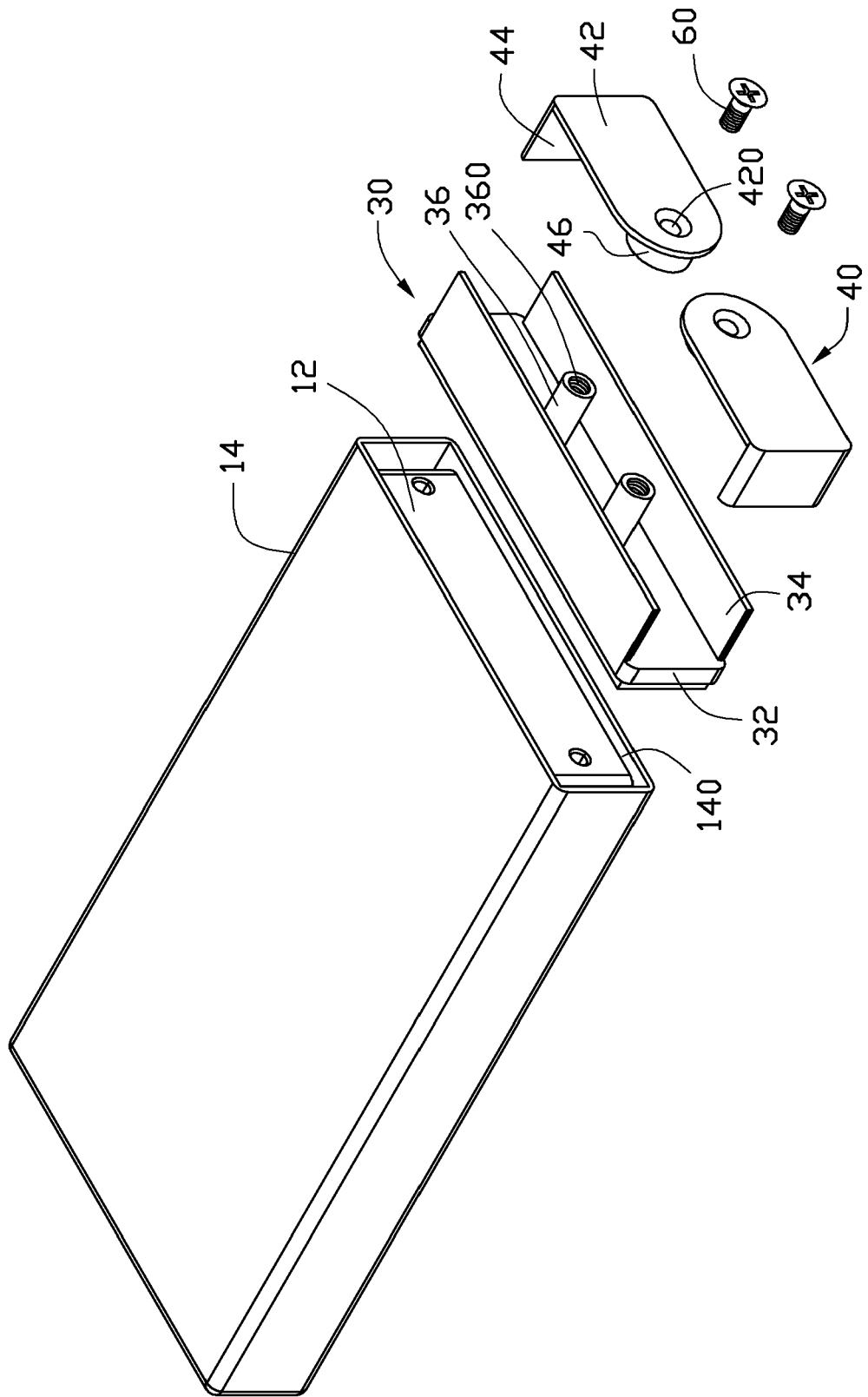
FIG. 2 is an exploded view of FIG. 1.

Referring to FIGS. 1-2, a bracket 20 of an embodiment of the present disclosure is illustrated as being mounted on a portable hard disk 10. The portable hard disk 10 includes a shell 14 having an opening 140 defined in a front thereof, and a rectangular storage medium 12 received in the shell 14. The bracket 20 includes a base 30 connected to the portable hard disk 10 and a pair of arms 40 pivotably attached to the base 30.

Figure 3:
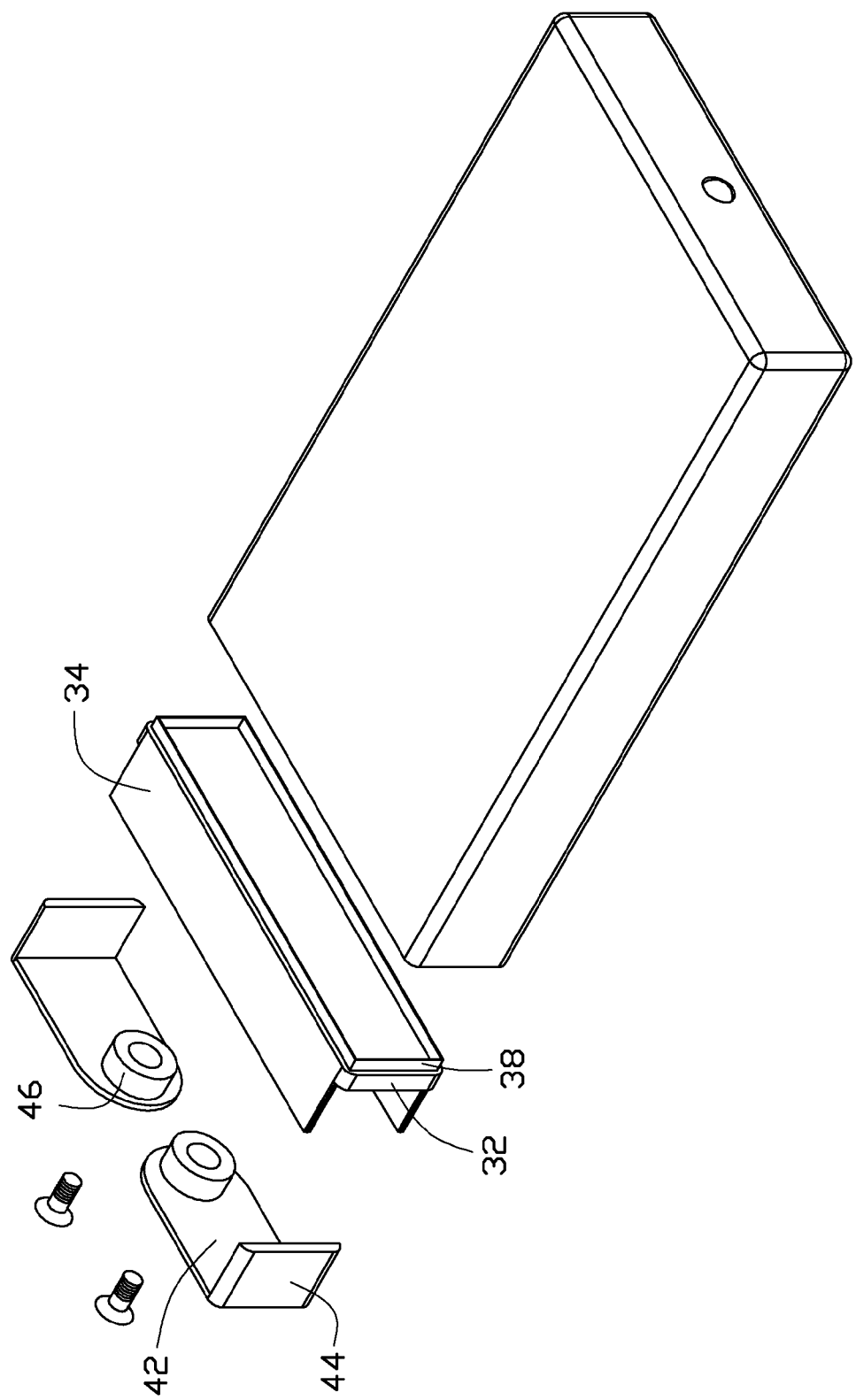
FIG. 3 is an inverted view of FIG. 2.

Also referring to FIG. 3, the base 30 includes a rectangular plate 32, a pair of sidewalls 34 respectively extending frontward from a bottom and a top of the plate 32, a pair of posts 36 extending frontward and perpendicularly from the plate 32 between the sidewalls 34, and a hem 38 extending rearward and perpendicularly from the plate 32. The plate 32 has an area similar to that of a cross-section of the shell 14 to substantially cover the opening 140 of the portable hard disk 10. Each sidewall 34 has a length equal to a width of the portable hard disk 10. The pair of posts 36 are located adjacent to a center of the plate 32. Each post 36 defines a threaded hole 360 therein to threadedly receive a screw 60. The hem 38 is annular and located neighboring a periphery of the plate 32. The posts 36 have heights larger than that of the sidewalls 34. The hem 38 is for engagingly fitting into the opening 140 of the portable hard disk 10 to fix the base 30 on the shell 14. The pair of arms 40 are respectively attached on the two posts 36. Each arm 40 includes a tab 42 parallel to the plate 32 and a flange 44 extending rearward and perpendicularly from an outer end of the tab 42. An inner end of each tab 42 is semicircular for preventing interference when rotating the two tabs 42 around respective posts 36. A through hole 420 is defined in the inner end of each tab 42 for allowing a corresponding screw 60 extending through the tab 42, thereby pivotably attaching the arm 40 on a corresponding post 36 of the bracket 20. The outer end of each tab 42 is rectangular and in consistence with a corresponding part of a profile of the plate 32. The flange 44 has a height similar to that of the sidewall 34 so that the flange 44 could be substantially received between the two sidewalls 34. A sleeve 46 is rearward formed from each tab 42 corresponding to the through hole 420. The posts 36 could be inserted in the sleeves 46 to position the two arms 40 on the base 30, respectively.

Figure 4:
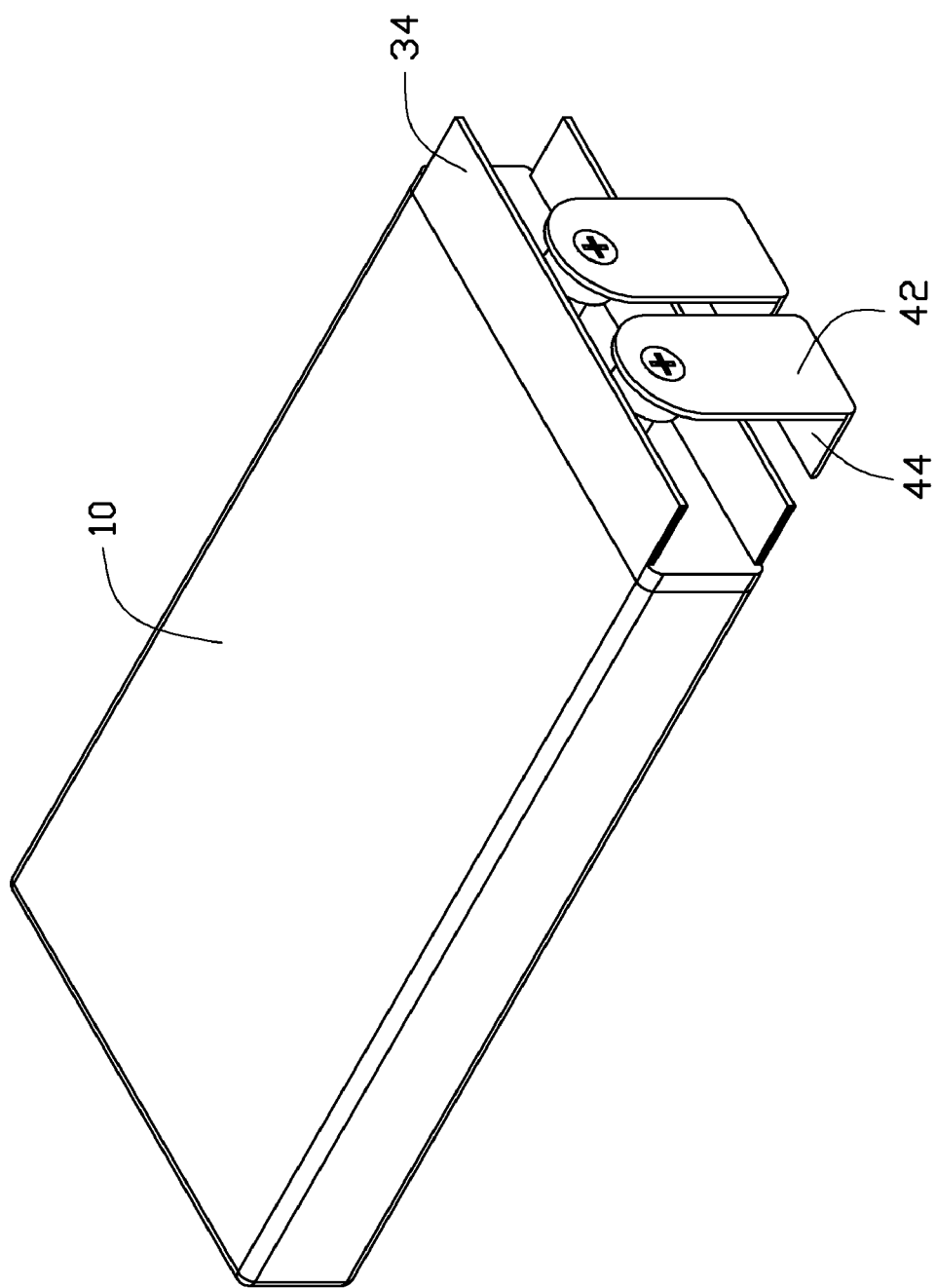
FIG. 4 is similar to FIG. 1, wherein the bracket is in an opened position.
Figure 5:
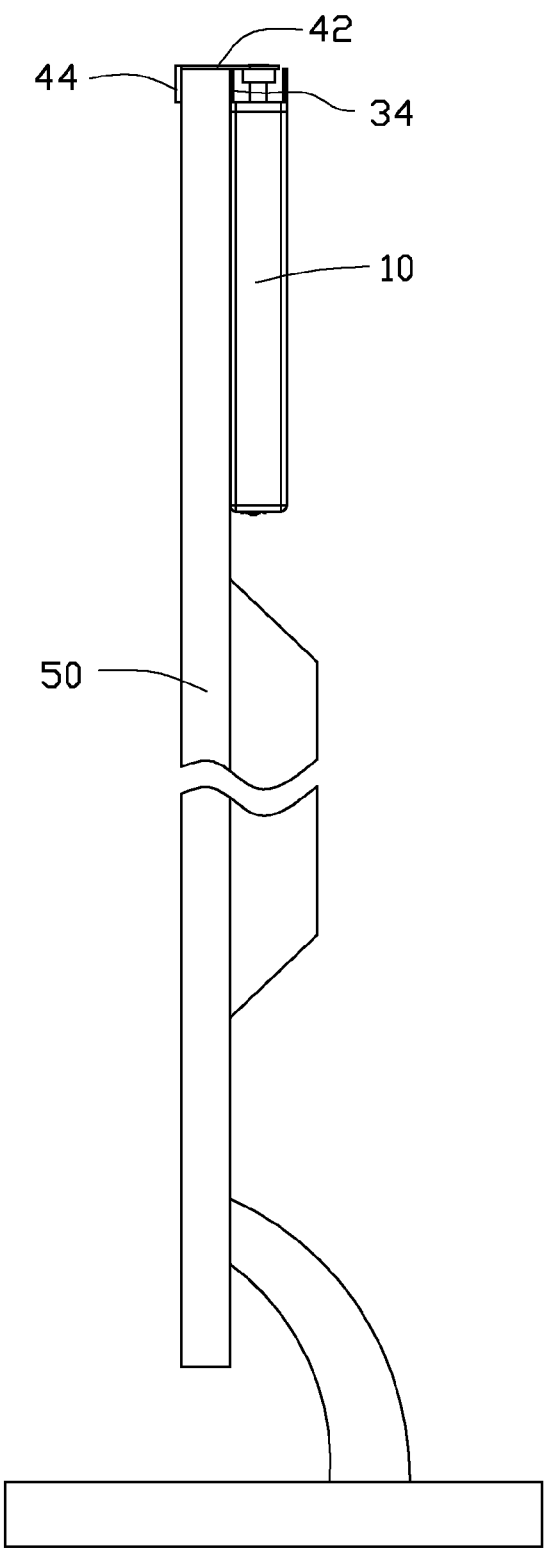
FIG. 5 shows the portable hard disk mounted on a display of a computer by the bracket of FIG. 1.

Also referring to FIGS. 4-5, in use, the two arms 40 are pivoted to an opened position where the two flanges 44 are remote from the sidewalls 34 in parallel manners, wherein each flange 44 is spaced from a corresponding sidewall 34 by a gap (shown in FIG. 4). The bracket 20 with the portable hard disk 10 is then mounted on a display 50 of a computer by receiving a top portion of the display 50 in the gap between the flanges 44 and the sidewalls 34 (shown in FIG. 5). Since two opposite faces of the top portion of the display 50 are respectively confined by the flanges 44 and the sidewalls 34 of the bracket 20, and a top face of the top portion of the display 50 is pressed by the tab 42 of the bracket 20, the bracket 20 with the portable hard disk 10 are stably retained on the display 50 of the computer. In comparison with the conventional method of directly disposing the portable hard disk 10 on the supportive surface of the disk, the portable hard disk 10 hung on the top portion of the display 50 by the bracket 20 could save space on the desk, and effectively prevent the user from impacting the portable hard disk 10 carelessly, thereby ensuring normal data-transferring between the portable hard disk 10 and the computer. Furthermore, the two arms 40 could be further folded within the base 30 of the bracket 20 as shown in FIG. 1, whereby the bracket 20 and the portable hard disk 10 would wholly present a regular rectangular shape for facilitating transport of the portable hard disk 10 with the bracket 20.

Alternatively, the bracket 20 can also be applied on other portable devices which require transferring data with computers, such as DAP (Digital Audio Player), PMP (Portable Multimedia Player), mobile phone or the like. Furthermore, the plate 32 of the bracket 20 can be directly fixed to the shell 14 of the portable hard disk 10 by adhersive materials, without forming the hem 38 into the shell 14.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A bracket for holding a portable device on a support, comprising:
   a base comprising a plate for being fixed to the portable device and a pair of sidewalls extending from the plate; and
   an arm pivotably attached on the base, the arm comprising a tab parallel to the plate and a flange extending from the tab towards the plate;
   wherein the arm is pivotable to a position where a gap is defined between a corresponding sidewall and the arm for receiving a portion of the support and the arm holds the portion of the support;
   wherein the arm is pivotable to another position where the arm is received between the pair of sidewalls;
   wherein the base further comprises a post extending from the plate towards the arm, the arm being pivotably attached to the post; and
   wherein the post has a height larger than that of each of the sidewalls.

2. The bracket as claimed in claim 1, wherein the flange is operable to be spaced from and parallel to a corresponding sidewall by the gap.

3. The bracket as claimed in claim 1, wherein the post is located between the two sidewalls.

4. The bracket as claimed in claim 1, wherein the tab has an arced end remote from the flange and a rectangular end connecting the flange.

5. The bracket as claimed in claim 4, wherein the arm comprises a sleeve formed on the arced end of the tab, the post being inserted into the sleeve.

6. The bracket as claimed in claim 1, wherein the base comprises a hem formed on the plate along a direction remote from the arm.

7. The bracket as claimed in claim 6, wherein the hem is annular and located adjacent to a periphery of the plate.

8. A portable electronic device assembly for being mounted on a support, comprising:
   a portable electronic device; and
   a bracket, comprising:
     a base fixed to the portable electronic device; and
     an arm pivotably attached on the base;
     wherein the arm is pivotable relative to the base to an opened position where the arm is staggered with the base to form a gap therebetween for receiving a top of the support;
     wherein the arm is pivotable relative to the base to a closed position where the arm is received within the base so that the whole portable electronic device assembly presents a regular shape;
     wherein the base comprises a plate mounted to the portable electronic device, a pair of sidewalls extending from two opposite sides of the plate towards the arm, and a post extending from the plate towards the arm, the arm being pivotably mounted to the post; and
     wherein the post has a height larger than that of each of the sidewalls.

9. The portable electronic device assembly as claimed in claim 8, wherein the arm comprises a tab and a flange extending from the tab towards the base.

10. The portable electronic device assembly as claimed in claim 9, wherein the arm is received between the two sidewalls when in the closed position, and the arm has the flange spaced from a corresponding sidewall by the gap when in the opened position.

11. The portable electronic device assembly as claimed in claim 10, wherein the tab of the arm is pivotably mounted to the post by a fastener.

12. The portable electronic device assembly as claimed in claim 8, wherein the portable electronic device is a portable hard disk.

13. A bracket for holding a portable device on a support, comprising:
   a base comprising a plate for being fixed to the portable device and a pair of sidewalls extending from the plate; and
   an arm pivotably attached on the base, the arm comprising a tab parallel to the plate and a flange extending from the tab towards the plate, the tab having an arced end remote from the flange and a rectangular end connecting the flange;
   wherein the arm is pivotable to a position where a gap is defined between a corresponding sidewall and the arm for receiving a portion of the support and the arm holds the portion of the support;
   wherein the arm is pivotable to another position where the arm is received between the pair of sidewalls; and
   wherein the base further comprises a post extending from the plate towards the arm, the arm being pivotably attached to the post.

14. The bracket as claimed in claim 13, wherein the arm comprises a sleeve formed on the arced end of the tab, the post being inserted into the sleeve.

* * * * *